J. MACNISH.
Rotary Churn.
No. 20,803.
Patented July 6, 1858.
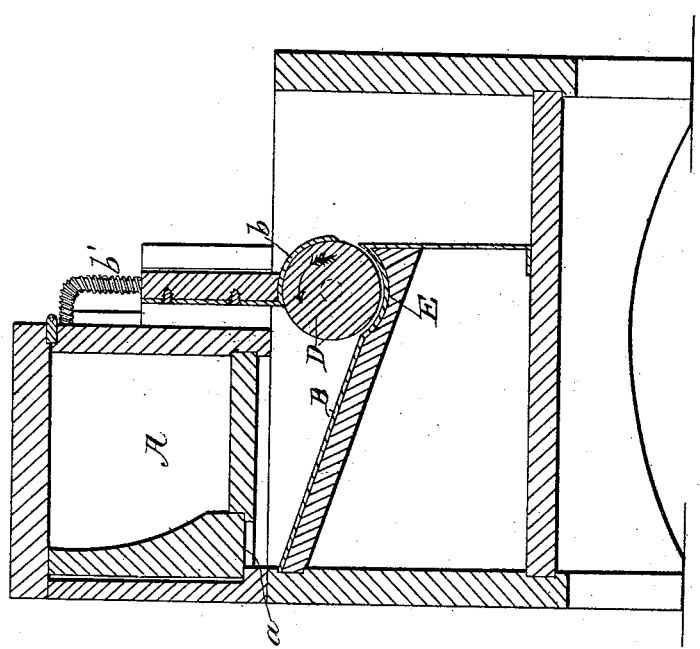
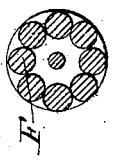
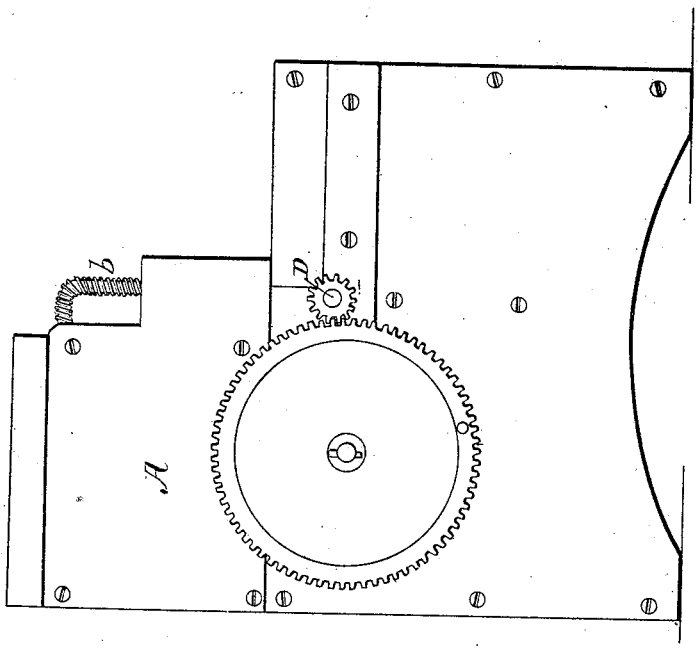

UNITED STATES PATENT OFFICE.

JAS. MACNISH, OF BERLIN, WISCONSIN.

CHURN.

Specification of Letters Patent No. 20,803, dated July 6, 1858.

*To all whom it may concern:*

Be it known that I, JAMES MACNISH, of Berlin, in the county of Marquette and State of Wisconsin, have invented a new and useful Improvement in Churns; and I do hereby declare that the following is a full, clear, and exact description of the same, reference being had to the accompanying drawings, forming a part of this specification, in which—

Figure 1, is a side elevation of a churn constructed with my improvements. Fig. 2, is a vertical central section of the same.

Similar letters of reference in each of the several figures indicate corresponding parts.

The nature of my improvement consists in effecting the breaking of the globules or sacks which contain the fatty particles of the milk or cream by the combined forces of compression and friction, employing for producing these forces a roller in combination with a stationary concave, the roller revolving within and coming in contact with said concave.

To enable others, skilled in the art, to make and use my invention, I will proceed to describe its construction and operation.

A, B, C, represents a churn box adapted for carrying out my invention successfully. D, is an expressing and friction roller arranged to fit snugly, yet be capable of revolving in a concave or circular casing E. The concave E, is arranged at the lower end of an inclined apron B, of the churn box, and the cream is conducted to the concave, as it escapes gradually at $a$ from the chamber A, of the churn tub, by means of said inclined apron. The roller D, or its equivalent F, is held down in the concave by means of a spring plate $b$, which extends from end to end of the roller and partly encircles it. This spring plate is made yielding up and down by means of spiral springs $b'$, $b'$, and besides giving increased force to the roller serves as a scraper for scraping or doffing the butter from the roller into the receiving chamber C, of the churn tub as the roller revolves in the direction of the arrow. Instead of using a concave in the location shown, it might be found advantageous to place the roller, Fig. 3, in an ordinary churn box which has a concave bottom, and to have it come in contact with the concave bottom surrounded by the cream. With this arrangement, by giving the roller a rapid revolution, the cream will be subjected to an expressing, friction and agitating force. The cream only requires to pass between the roller and the concave once in order to produce butter. The butter milk and butter fall into the receptacle C, and the butter is operated upon by a spatula until collected into a lump and when it is removed, the butter-milk may be let off by an ordinary faucet at the bottom of the receptacle C.

By my invention butter can be produced more rapidly, and a greater amount from a given quantity of cream or milk than by any other process, as every globule or sack is necessarily broken.

What I claim as my invention and desire to secure by Letters Patent, is—

Effecting the breakage of the globules or sacks which contain the fatty particles of the milk or cream by the combined forces of compression and friction, employing for producing these forces, a roller in combination with a stationary concave, the roller revolving within and coming in contact with said concave, substantially as and for the purposes set forth.

JAMES MACNISH.

Witnesses:
G. YORKE AT LEE,
AARON HILTON.